(12) United States Patent
Hsu

(10) Patent No.: US 6,297,313 B1
(45) Date of Patent: Oct. 2, 2001

(54) ADHESIVE SYSTEMS AND PRODUCTS FORMED USING SAME AND METHODS FOR PRODUCING SAID ADHESIVE SYSTEMS AND PRODUCTS

(75) Inventor: Wu-Hsiung Ernest Hsu, Tualatin, OR (US)

(73) Assignee: Louisiana-Pacific Corporation, Portland, OR (US)

( * ) Notice: Subject to any disclaimer, the term of this patent is extended or adjusted under 35 U.S.C. 154(b) by 0 days.

(21) Appl. No.: 09/360,842

(22) Filed: Jul. 22, 1999

(51) Int. Cl.[7] ............... C08J 3/00; C08K 3/20; C08L 75/00; C08L 51/00; C08L 61/00

(52) U.S. Cl. ............ 524/542; 524/424; 524/425; 524/280; 524/589; 528/44; 528/85

(58) Field of Search ................... 524/542, 424, 524/425, 280, 589; 528/44, 85

(56) References Cited

U.S. PATENT DOCUMENTS

| | | |
|---|---|---|
| 3,919,017 | 11/1975 | Shoemaker . |
| 4,209,433 | 6/1980 | Hse . |
| 4,388,138 | 6/1983 | Brown et al. . |
| 4,402,896 | 9/1983 | Betzner et al. . |
| 4,407,771 | 10/1983 | Betzner et al. . |
| 4,533,436 | 8/1985 | Betzner et al. . |
| 4,540,724 | 9/1985 | Dunnavant et al. . |
| 4,833,182 | 5/1989 | Israel . |
| 4,898,776 | 2/1990 | Israel et al. . |
| 4,961,795 | 10/1990 | Detlefsen . |
| 5,221,710 | * 6/1993 | Markusch et al. ............ 524/591 |
| 5,223,587 | 6/1993 | Tsuruta . |
| 5,374,474 | 12/1994 | Pratt et al. . |
| 5,407,980 | 4/1995 | Pizzi . |
| 5,425,976 | 6/1995 | Clarke et al. . |
| 5,470,631 | 11/1995 | Lindquist et al. . |
| 5,525,394 | 6/1996 | Clarke et al. . |
| 5,637,658 | 6/1997 | Teodorczyk . |
| 5,647,934 | 7/1997 | Vaders et al. . |
| 5,674,971 | 10/1997 | Graves . |
| 5,718,786 | 2/1998 | Lindquist et al. . |
| 5,750,201 | 5/1998 | Phanopoulos et al. . |
| 6,150,492 | 11/2000 | Phillips et al. . |

OTHER PUBLICATIONS

U.S. Classification Manual, Dec. 1992.*

* cited by examiner

Primary Examiner—Patrick D. Niland
(74) Attorney, Agent, or Firm—Marger Johnson & McCollom, P.C.

(57) ABSTRACT

According to the teachings of the present invention, a sprayable adhesive system is produced by a method which subsequently sprays the system onto and adheres together lignocellulosic particles in the formation of a lignocellulosic particulate composite structures. The sprayable adhesive system is formed prior to spraying same onto lignocellulosic particles by precombining the adhesive system components prior to applying same to the lignocellulosic particles. The adhesive system typically comprises an adhesive composition comprising an aldehyde resin and a polymeric isocyanate.

44 Claims, 2 Drawing Sheets

ADHESIVE SYSTEMS AND PRODUCTS FORMED USING SAME AND METHODS FOR PRODUCING SAID ADHESIVE SYSTEMS AND PRODUCTS

BACKGROUND OF THE INVENTION

This invention relates to adhesive systems used in the manufacture of certain products, to the products which are formed using these adhesive systems, and to methods for producing the respective adhesive systems and the subject products. More specifically, this invention is directed to adhesive systems comprising aldehyde resins and polymeric isocyanates used in the manufacture of certain lignocelluosic products, to the lignocellulosic products which are formed using these aldehyde resin-polymeric isocyanate adhesive systems, and to methods for producing these aldehyde resin-polymeric isocyanate adhesive systems and lignocellulosic products.

At present PF resins still dominate the worldwide market for the production of exterior grade wood-based panels. However, PF resins present a problem in that a variety of formulations are employed due to the very different types and forms of wood used. Furthermore, PF resins have some serious limitations. For instance, PF resins are not able (i) to consistently bond wood panels of higher moisture content (8% to 12%), (ii) to form high quality, structural panels from medium density veneers and high density veneers (0.6 to 0.8 Kg/m3, and to accomplish all the above with lower adhesive spread levels. A resin of any nature or composition which is capable of overcoming all the defects of PF resins listed above, while still maintaining their excellent performance, would indeed be a great step forward in adhesives for exterior grade wood based panels.

Isocyanates (in particular MDI polymers) have been known in the wood industry for almost 25 years. These materials can produce excellent results when used as adhesives for particulate products but have been widely recognized as totally unsuitable for plywood. This is due to their low viscosity which makes these resins migrate from the glue-line into the veneers before and, more particularly, during plywood hot-pressing operations. This results in completely starving the glue-line of adhesive and leading to joints of very poor strength. A composite resin containing MDI which would be capable of utilizing the great strength capabilities of MDI, but which is capable of also bonding plywood, would become as successful in the field of plywood manufacture as MDI is successful today in bonding wood particle products.

In isocyanate and polyurethane chemistry, the belief was that in mixed resins containing MDI/phenol-formaldehyde, or MDI/melamine-formaldehyde and MID/urea-formaldehyde resins, the isocyanate group can react not only with water but also with the phenolic hydroxy groups of phenol of a given resin, and possibly with the amidic groups of urea and melamine resins. In reality, the latter reactions are slower than the reaction of MDI with water, and thus, such a system would largely lead to MDI deactivation, which is what has always been believed.

What has always been disregarded is that the isocyanate group (—N—C—O) can and does react extremely rapidly with the methylol group (hydroxybenzyl alcohol group) present in PF-MDI resols, and with the equally reactive methylol group present in MF-MDI and UF-MDI resins. The initial results indicate that this is indeed the case. Thus, the rate constants shown in Table 1 of U.S. Pat. No. 4,833,182 indicates that the reaction of the isocyanate group of MDI with methanol, and with the $CH_2OH$ groups of PF-MDI, MF-MDI and UF-MDI resins, occurs readily.

U.S. Pat. No. 5,407,980 attempts to solve the problems associated with combining a polymeric isocyanate and an aldehyde resin through the use of a tannin accelerator to modify the above-described problem reactions associated with conventional isocyanate-aldehyde chemistry. In summary, the isocyanate reacts with the phenol-formaldehyde resin, with the tannin, with the water and, probably, with the paraformaldehyde. The phenol-formaldehyde resin reacts with the isocyanate, with a tannin accelerator and with the paraformaldehyde. The tannin reacts with the isocyanate, with the phenol-formaldehyde resin and with the paraformaldehyde.

In U.S. Pat. No. 3,919,017 ("US '017"), isocyanate-formaldeyde binder systems were used in the manufacture of products from lignocellulosic materials, particularly particleboard. The particleboard was fabricated by the conventional manner of application employed in the prior art, namely, by spraying the lignocellulosic particles with binder as they are tumbled or agitated in a mixer. It is a basic understanding in the prior art, as expressed in US '017 in column 3, at lines 58–60, that the binder system components are separately added or applied to the lignocellulosic particles in order to avoid premature reactions between them. When the separate addition method of US '017 is employed, the order of addition of the respective binder system components is considered to be unimportant. EXAMPLE 1 of US '017 describes a typical method of separate binder component spray addition or application to lignocellulosic materials.

In U.S. Pat. No. 4,209,433 ("US 433"), the approach advanced in US '017 is modified by specifically delineating the order of spray addition of the binder system components. To achieve the advantages of the method of the present invention, the isocyanate polymer is applied to the lignocellulosic particles prior to the application of the aldehyde resin. Thereafter, the combined adhesive is reacted by heating same in situ to obtain an improved thermosetting adhesive resin and the advantages produced thereby. In accordance with the method of US '433, the prior application of the isocyanate polymer creates enhanced adhesive characteristics as well as improved tolerance of the adhesive to the wood species and to the process variables. According to US '433, upon initial application, the isocyanate polymer reacts readily with hydroxyl groups or water on the surface of or among the wood particles to form strong molecular bonding. Subsequently, a cross-linking reaction between isocyanate groups and the phenolic resin occurs, upon the introduction of the phenolic resin, thereby reinforcing the functionalities of the phenolic adhesive. The initial rapid reaction of the isocyanate polymer gives the combined resin system its improved tolerance to the wood species and to the process variables.

The method of US '433, and the advantages produced thereby, are not dependent upon the particular method utilized in the fabrication of the particle board, except of course, the requirement that the isocyanate polymer be applied prior to the phenolic resin. In general, the method for fabricating the particleboard involves the application of the adhesive composition, isocyanate polymer first, to the wood chips with subsequent application of heat and pressure to form the board into its desired configuration. The isocyanate polymer and phenolic adhesives are separately applied to the wood chips by any conventional means such as spray coating, coating or other dispersion of the adhesive and wood. Unfortunately, this adhesive system and application method fails to provide a satisfactory result for use with lignocellulosic materials such as OSB due to the low resin content used.

All of the issued patents cited in this application are incorporated in their entirety by reference.

SUMMARY OF THE INVENTION

It has now been discovered that in accordance with the present invention, an adhesive system can be provided for adhering together lignocellulosic particles in the formation of a lignocellulosic particulate composite structure having the attributes of low cost, fast cure and good performance criteria. The subject adhesive system is formed by combining together the individual components while maintaining a flowable condition, i.e., a relatively low viscosity, prior to applying of the adhesive onto the lignocellulosic particles. In this way, the adhesive system has a pot life long enough for performing commercial bonding applications.

It has been determined herein that conventional separate addition of the individual adhesive components to the lignocellulosic particles without precombining same results in substantial solids buildup in the feed lines and in the reaction equipment. This causes substantial unwanted downtime due to feed line and equipment cleaning requirements. Unexpectedly, when the individual adhesive components are precombined together, the feed lines can be readily cleaned with only water, and it is presumed that the problems associated with buildup in the reaction equipment will be substantially diminished. This in turn will substantially reduce the level of downtime experienced by manufacturers of the resultant lignocellulosic particulate composite structures.

According to the teachings of the present invention, an adhesive system, preferably a sprayable adhesive system, is produced by a method which subsequently applies same onto, and adheres together, lignocellulosic particles in the formation of a lignocellulosic particulate composite structures. The adhesive system is typically an adhesive composition comprising an aldehyde resin and a polymeric isocyanate. Preferably, the adhesive system comprises a sprayable emulsion.

The weight ratio of said aldehyde resin to said polymeric isocyanate is at least about 1. Moreover, the polymeric isocyanate of the subject system has an isocyanate group (—NCO) content of at least about 20%.

The system and method can further include a carbonate material. Carbonate materials can be employed enhance the curing of the aldehyde resin portion of the adhesive system of the present invention, particularly in adhesive systems which include higher amounts of the aldehyde resin component. The carbonate material preferably comprises an organic carbonate material, more preferably an alkylene carbonate material having from about 1–8 carbon atoms, most preferably propylene carbonate. The carbonate material is preferably employed in the form of a dilute solution. Typically, the dilute solution of carbonate material is provided in a concentration up to about 10% by weight, based on the weight of the adhesive material.

In order to facilitate the flowability requirements of this invention, the typical aldehyde resin and polymeric isocyanate composition of this invention is designed to have an average viscosity of not more than about 500 cps, preferably not more than about 400 cps, more preferably not more than about 300 cps, and most preferably not more than about 250 cps, for a period of time up to about 2 hours, preferably 3 hours, and more preferably 4 hours, from the substantial completion of the formation of the system. Stated another way, the system has a pot life of at least about 2 hours, preferably 3 hours, and more preferably 4 hours, from substantial completion of the formation thereof.

The preferred aldehyde resin-polymeric isocyanate system of the present invention has an onset temperature which is lower than an onset temperature of either one of the aldehyde resin and the polymeric isocyanate, individually. In another aspect of the preferred aldehyde resin-polymeric isocyanate system, a cure time is provided which is faster than the cure time of either one of the aldehyde resin and the polymeric isocyanate, individually.

The subject aldehyde resin-polymeric isocyanate system can also have a cure speed wherein both the cure speeds of the aldehyde resin and the polymeric isocyanate components are substantially the same. This preferred feature of the present invention is pictorially demonstrated in FIG. 3. This result is totally and unexpectedly different than, for example, when an aldehyde resin per se is employed, as is depicted in FIG. 2. The individual DSC scans as a function of temperature for the combined aldehyde-isocyanate resins employed in the DSC composite scan of FIG. 3, are substantially superimposed, i.e., are substantially the same. On the other hand, the individual DSC scans for the same aldehyde resins without any isocyanate polymeric resin are different, i.e., is not substantially superimposed. DSC is an analytical measurement of the heat flow over time of a given polymeric material. The DSC v. time curve for the polymeric systems described above, which are graphically depicted in FIGS. 2 and 3, were for a DSC ramp up conducted at a rate of about 10 degrees C. per minute over a temperature range of 25 to 200 degrees C.

Preferably, the system has a similar cure speed at aldehyde resin to polymeric isocyanate ratios of from about 1:1 up to about 4:1, more preferably from about 1.5:1 up to about 3.5:1, and most preferably from about 2.0:1 up to about 3.0:1. Furthermore, the preferred system has an onset temperature range of from about 115 up to about 125 degree C. at aldehyde resin to polymeric isocyanate ratios of from about 1:1 up to about 2:1.

The subject method can include the step of mixing together the aldehyde resin and the polymeric isocyanate prior to applying same to the lignocellulosic material. It can also include the steps of combining in-line the aldehyde resin and the polymeric isocyanate prior to application of the adhesive system to the lignocellulosic material. Preferably, the mixing step can comprise in-line static mixing of the aldehyde resin and the polymeric isocyanate. A further preferred method of operation includes the step of initially reacting the polymeric isocyanate and the aldehyde resin so that the formation of the lignocellulosic composite structure is incomplete. Then, the formation of said lignocellulosic composite structure is subsequently finally completed under heat and pressure.

DETAILED DESCRIPTION OF A PREFERRED EMBODIMENT

Figure 1:
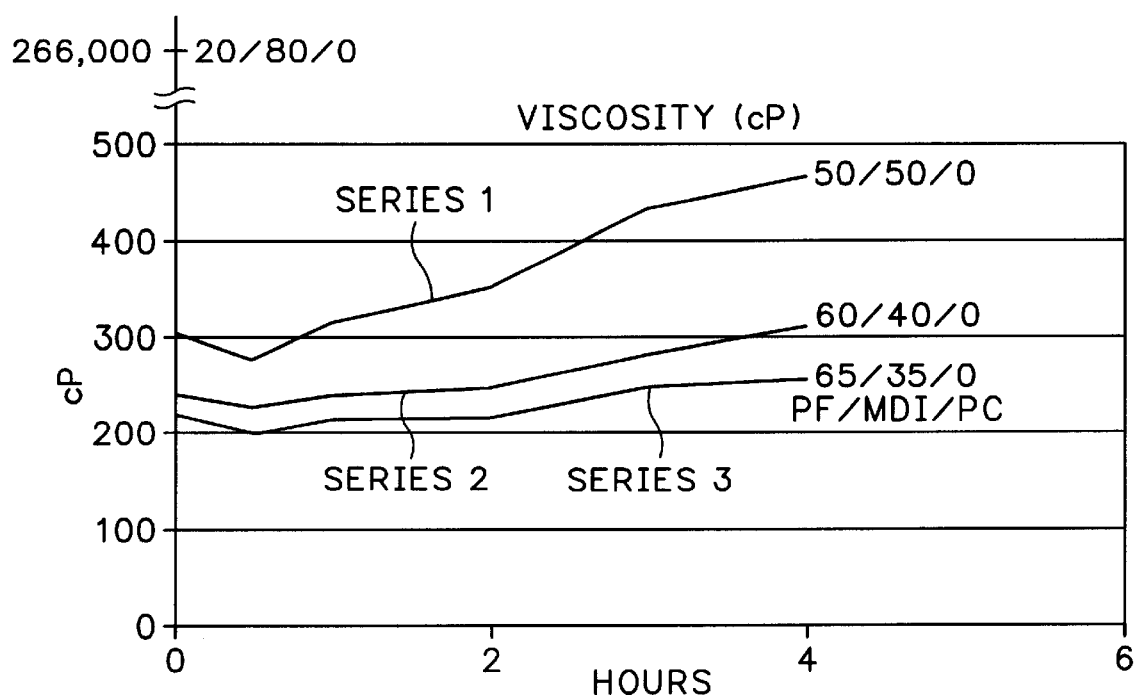
FIG. 1 is a graphical representation of viscosity as a function of time for a series of phenol-formaldehyde/MDI resins (Series 1–3 of Example 2) of varying weight ratios from 65:35 to 50:50, with and without a carbonate additive, as well as for a sample having a 20:80 ratio.
Figure 2:
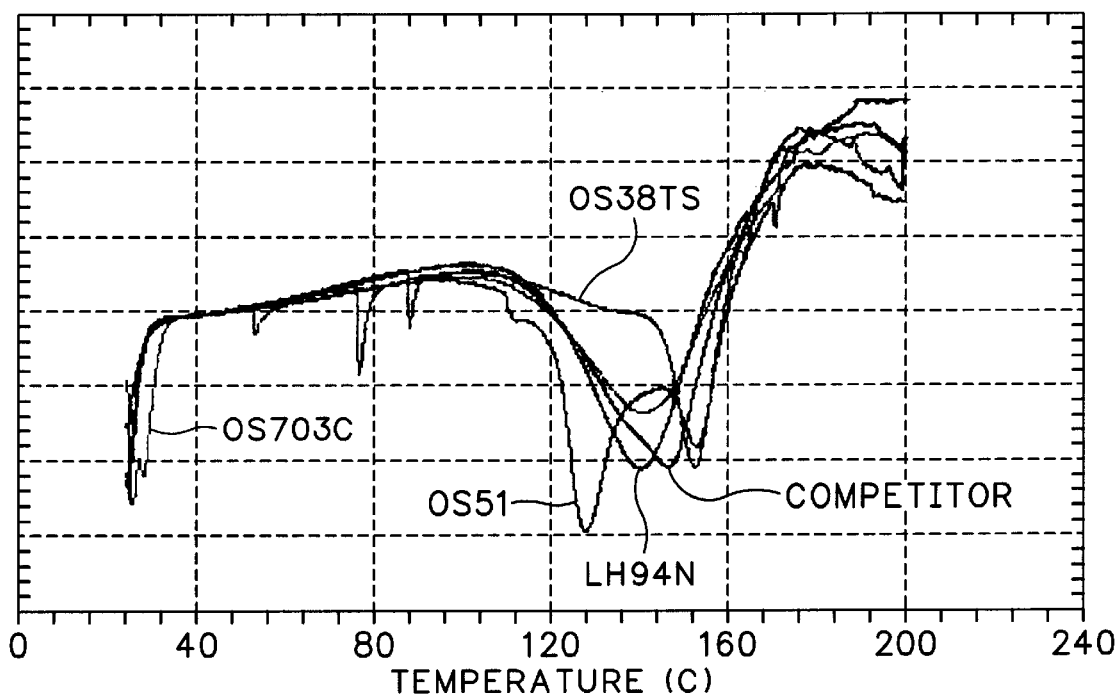
FIG. 2 is a DSC Scan of various PF-type resins without a polymeric isocyanate.
Figure 3:
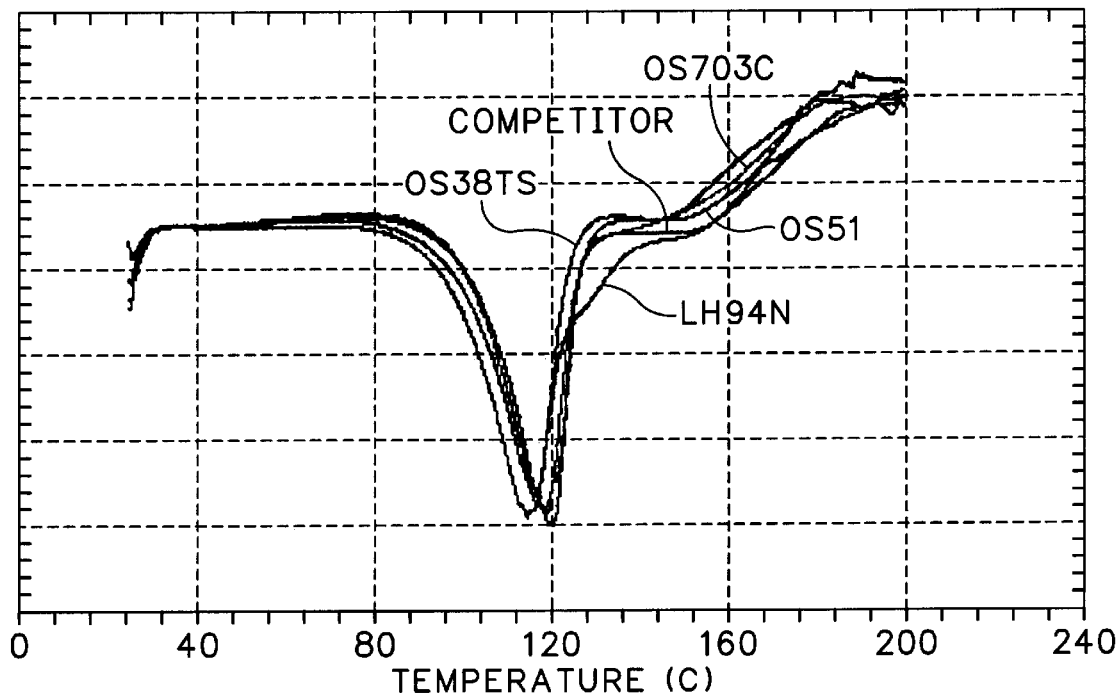
FIG. 3 is a DSC Scan of various PF-type resins including polymeric isocyanate resins.

The term "particleboard" as used herein describes those composite boards known as particleboard, chipboard, waferboard, fiberboard and oriented strandboard wherein the board substrate is prepared by application of an adhesive to lignocellulosic particles, chips or fibers, specifically wood particles, wood chips and lignocellulosic fibers and subsequently formed into the desired board through application of heat and pressure. While reference will be made generically to particleboard throughout the remainder of this application, it should be understood that this invention is applicable to other equivalent forms of this type of product. Similarly, the method of the present invention and its attended advantages can be achieved with respect to various forms of lignocellulosic starting material and is not limited to any particular form. The use of wood chips, however, in the formation of a typical particleboard comprises the preferred environment for the method of the present invention.

Many board products are manufactured by the basic process of consolidating or joining together bodies of lignocellulosic and/or lignocellulosic materials using pressure, heat and a chemical binder such as an adhesive material. The method of the present invention is suitable for processing lignocellulosic starting materials in general, and is particularly useful for forming wood particles into board products. Mixtures of lignocellulosic particles may be used. Typically, such materials are wood particles derived from wood and wood residues such as wood chips, wood fibers, shavings, veneers, wood wool, cork, bark, sawdust, and the like. Particles of other lignocellulosic material such as shredded paper, pulp or vegetable fibers such as corn stalks, straw, bagasse and the like, and of non-lignocellulosic materials such as shredded scrap rubber, polyurethane, polyisocyanurate and like cellular and non-cellular polymers can also be used.

The board is produced according to the method of the invention by bonding together particles of wood or other lignocellulosic material using heat, pressure and the binder system of the invention. The invention particularly relates to a process of preparing synthetic boards wherein lignocellulosic material is contacted with an improved binder and the treated material is subsequently formed into boards by the application of heat and pressure, the improved binder comprising an organic isocyanate polymer and a polyester polyol. While the process is particularly suitable for the manufacture of waferboard, oriented waferboard, particleboard, and oriented strand board, it is not limited in this respect and can also be used in the manufacture of medium density fiberboard, plywood, etc.

The adhesive system of the present invention comprises both an isocyanate polymer and an aldehyde polymer resin which combined one with other prior to applying onto and adhering together lignocellulosic particles.

le;.5qThe adhesive system also includes aldehyde resins. For example, these aldehyde resins can comprise thermosetting resins such as phenol-formaldehyde, resorcinol-formaldehyde, melamine-formaldehyde, urea-formaldehyde, modified lignosulfonates, urea-furfural and condensed furfuryl alcohol resins. The phenolic component can include any one or more of the phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para- positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include: phenol, 2,6 xylenol, o-cresol, m-cresol, p-cresol, 3,5-xylenol, 3-4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The isocyanate polymer of the binder system may suitably be any organic isocyanate polymer compound containing at least 2 active isocyanate groups per molecule, or mixtures of such compounds. Generally, the isocyanate polymers employed in the method of this invention are those which have an isocyanato group functionality of at least about two. Preferably, this functionality ranges from 2.3 to 3.5 with an isocyanate equivalent of 132 to 135. The isocyanato functionality can be determined from the percent available NCO groups and the average molecular weight of the isocyanate polymer composition. The percent available NCO groups can be determined by the procedures of ASTM test method D1638.

The isocyanate polymers which can be employed in the method of the present invention can be those that are typically employed in adhesive compositions, including typical aromatic, aliphatic and cycloaliphatic isocyanate polymers. Representative aromatic isocyanate polymers include 2,4-tolylene diisocyanate, 2,6-tolylene diisocyanate, 4,4'-methylene bis(phenyl isocyanate), 1,3-phenylene diisocyanate, triphenylmethane triisocyanate, 2,4,4'-triisocyanatodiphenyl ether, 2,4-bis(4-isocyanatobenzyl) phenylisocyanate and related polyaryl polyiscocyanates, 1,5-naphthalene diisocyanate and mixtures thereof. Representative aliphatic isocyanate polymers include hexamethylene diisocyanate, xylylene diisocyanate, 1,12-dodecane diisocyanate and lysine ethyl ester diisocyanate. Representative cycloaliphatic isocyanate polymers include 4,4'-methylenebis (cyclohexyl isocyanate), 1,4-cyclohexylene diisocyanate, 1-methyl-2,4-cyclohexylene diisocyanate and 2,4-bis(4-isocyanatocyclohexylmethyl) cyclohexyl isocyanate. The isocyanate polymer is typically applied in its liquid form. Generally, when a phenol-formaldehyde resin is used as the phenolic resin it is present in the adhesive composition used in the method of the present invention within the range of about 50 to 90% by weight, preferably within the range of about 60 to 80% by weight of the total amount of adhesive. Generally, the isocyanate polymer is present in an amount of about 10% to 50% isocyanate polymer, preferably 20 to 40%, by weight. When the adhesive system is used according to these percentages, one achieves a commercially attractive combination of desired board properties and economic advantages.

In the method of the present invention, the adhesive system, as previously described, is applied to the lignocellulosic particles by standard applying techniques. To achieve the advantages of the present invention, in the application of the adhesive system, it is necessary that the isocyanate polymer and aldehyde resin be combined together prior to application to the lignocellulosic particles. Such application sequence imparts enhanced strength characteristics to the resulting particle board as compared to separate application of the isocyanate polymer and phenolic resin onto the lignocellulosic particles.

The present invention relates to the fabrication of particle isocyanate polymerboard which involves the application of the adhesive composition of the combined isocyanate polymer and aldehyde resin to the lignocellulosic particles with subsequent application of heat and pressure to form the board into its desired configuration. It should be appreciated that the adhesive composition can be applied to the lignocellulosic particles in any conventional means such as spray coating of the adhesive composition onto the lignocellulosic particles.

In a typical method of this inveniton, a first layer of lignocellulosic particles and combined adhesive is generally layered down on a caul plate. This first layer is termed the face mix and forms the face of the finished particleboard. After the face mix is layed on the caul, a second layer of lignocellulosic particles and adhesive is layed down on top of the face mix. This second layer is termed the core mix since it will form the core of the finished particleboard. Following this a third layer of lignocellulosic particles and adhesive is layed down on top of the core mix. This third layer is also a face mix and will form the opposite face of the finished particleboard. The three layers so layed down on the caul plate are termed the mat.

The mat, including a caul plate is loaded into a press and a pressing operation is carried out in order to form the desired particle board. By way of example a mat which has an initial thickness of about 3 ½ inches may be pressed down to a thickness of about 0.7 inch or a mat which has an initial thickness of 7 inches may be pressed down to a final thickness of approximately 1 ⅞ inches. During typical pressing operation, the mats are generally heated to a temperature of between about 395–430 degrees F. as they are being compressed at about 450–700 psi. The exact conditions utilized in the pressing and heat curing of the particleboard can, of course, be easily selected by one skilled in the art depending, of course, upon the desired characteristics of the final product.

EXAMPLE 1

Lignocelluosic wafers were dried to a 4% moisture content and then blended with a phenol formaldehyde (PF) resin/MDI resin mixture. PF resin and MDI resin were added from two separate containers into a static mixer. The ratio of PF to MDI used was 65 parts by weight of PF and 35 parts by weight of MDI. The total amount of PF-MDI resin used was 2.5% based on the dry weight of the lignocellulosic wafers. The mixed PF-MDI resin was applied onto the wafers using a spinning disc in a lab rotary blender. The PF-MDI resin-treated wafers were used for the core layer of experimental panels produced therefrom.

Additional dry lignocellulosic wafers were blended with 3% liquid PF resin and 1% of wax, based on the dry weight of the wafers. These additional blended wafers were then used for the surface layers of the experimental panels. The blended wafers were hand felted onto a screen caul within a 34×34 inch deckle formation box to form a mat which produced a 7/16 inch thick pressed board at a target density of 38 pounds per cubic foot. The mats were pressed at 420 degrees F. for 120 sec of press time. In addition, control panels were produced with the core layer bonded with 1% wax and 2% MDI, i.e., without PF resin in the core. These panels were then evaluated according to standard methods specified by ASTM D1037.

The results of the panel tests are summarized below in TABLE 1, as follows:

TABLE 1

| PF:MDI % RESIN CONTENT WGT RATIO | | WET MODULUS OF RUPTURE | INTERNAL BOND | BOARD DENSITY |
| --- | --- | --- | --- | --- |
| 0:100 | 2.0% | 1611 psi | 52.7 psi | 38.0 lb/ft3 |
| 65:35 | 2.5% | 1775 psi | 52.1 psi | 38.5 lb/ft3 |

Unexpectedly, the physical properties of the panel samples prepared using a 65:35 PF:MDI resin were slightly better than those prepared using 100% MDI resin.

EXAMPLE 2

Using the procedure described in EXAMPLE 1, three series of PF-MDI resin premixed samples (denoted as Series 1–3) were prepared at the various weight ratios indicated below in TABLE 2. Viscosity measurements were run initially, at 0.5 hour, and then hourly from 1.0 to 4.0 hours. The premixed samples, which contained from 50 up to 65 parts of PF resin, exhibited initial viscosities of from 221 CPS to 304 CPS. Even after 4.0 hours, these premixed samples showed viscosity's of only from 257 to 467 CPS. The viscosity data in centipoises as a function of time (0 to 4 hours) for Series 1–3 is pictorially shown in FIG. 1. Because of these unexpectedly low viscosities, the feed pipe for the premixed resin samples could be readily cleaned using only water.

A sample of the PF-MDI resin was also premixed at 20:80 weight ratio. This latter sample exhibited an initial viscosity of 266,000 CPS.

TABLE 2

| TIME (HOURS) | Series 1 PF-MDI* (50–50) | Series 2 PF-MDI* (60–40) | Series 3 PF-MDI* (65–35) |
| --- | --- | --- | --- |
| 0 | 304 | 240 | 221 |
| 0.5 | 278 | 225 | 201 |
| 1.0 | 314 | 238 | 214 |
| 2.0 | 352 | 245 | 216 |
| 3.0 | 434 | 282 | 246 |
| 4.0 | 467 | 308 | 257 |

*viscosity in CPS

Having described and illustrated the principles the invention in a preferred embodiment thereof, it should be apparent that the invention can be modified in arrangement and detail without departing from such principles. We claim all modifications and variations coming within the spirit and scope of the following claims.

I claim the following:

1. An adhesive system comprising a sprayable adhesive composition, consisting essentially of an aldehyde resin and an isocyanate polymer, the weight ratio of said aldehyde resin to said isocyanate polymer is at least about 1, for adhering together lignocellulosic particles in the formation of a lignocellulosic particulate composite structure.

2. The system of claim 1, which further includes a carbonate material.

3. The system of claim 2, wherein said carbonate material comprises an organic carbonate material.

4. The system of claim 1, wherein said isocyanate polymer has an isocyanate group (—NCO) content of at least about 20%.

5. The system of claim 1, wherein said adhesive composition has an average viscosity of not more than about 500 cps for up to about 2 hours from the substantial completion of the formation of said system.

6. The system of claim 1, which has a pot life of at least about 2 hours from substantial completion of the formation of said system.

7. The system of claim 1, which comprises a sprayable emulsion.

8. The system of claim 1, which has an onset temperature which is lower than an onset temperature of either one of the aldehyde resin and the isocyanate polymer, individually.

9. The system of claim 1, wherein the cure speed of both the aldehyde resin and the isocyanate polymer in said system are substantially the same.

10. The system of claim 1, which has a similar cure speed at aldehyde resin to isocyanate polymer ratios of from about 1:1 up to about 4:1.

11. The system of claim 1, which has a cure time which is faster than the cure time of either one of the aldehyde resin and the isocyanate polymer, individually, thereby increasing throughput rate of the system.

12. The system of claim 1, which has an onset temperature range of from about 115 up to about 125 degree C. at aldehyde resin to isocyanate polymer ratios of from about 1:1 up to about 2:1.

13. The system of claim 1, wherein said adhesive composition has an average viscosity of not more than about 450 cps for up to about 3 hours from the substantial completion of the formation of said system.

14. A method for producing a sprayable adhesive system for applying onto and adhering together lignocellulosic particles in the formation of lignocellulosic particulate composite structure, said method comprising forming an adhesive composition consisting essentially of an aldehyde resin and a isocyanate polymer, the weight ratio of said aldehyde resin to said isocyanate polymer is a least about 1.

15. The method of claim 14, which further includes the step of adding a carbonate material to said adhesive composition.

16. The method of claim 14, wherein said carbonate material comprises an organic carbonate material.

17. The method of claim 14, wherein said isocyanate polymer has an isocyanate group (—NCO) content of at least about 20%.

18. The method of claim 14, wherein said adhesive composition has an average viscosity of not more than about 500 cps for up to about 4 hours from the substantial completion of the formation of said system.

19. The method of claim 14, wherein said adhesive composition has an average viscosity of not more than about 400 cps for up to about 2 hours from the substantial completion of the formation of said system.

20. The method of claim 14, wherein said adhesive composition has a pot life of at least about 4 hours from the formation of said system.

21. The method of claim 14, wherein said adhesive composition comprises a sprayable emulsion.

22. The method of claim 14, wherein said adhesive composition has an onset temperature which is lower than an onset temperature of either one of the aldehyde resin and the isocyanate polymer, individually.

23. The method of claim 14, wherein the cure speed of the aldehyde resin and the isocyanate polymer in said system are substantially the same.

24. The method of claim 14, wherein said adhesive composition has a similar cure speed at aldehyde resin to isocyanate polymer ratios of from about 1:1 up to about 4:1.

25. The method of claim 14, wherein said adhesive composition has a cure time which is faster than the cure time of either one of the aldehyde resin and the isocyanate polymer thereby increasing throughput and reducing downtime of the formation of the lignocellulosic particulate composite structure.

26. The method of claim 14, which has an onset temperature range of from about 115 up to about 125 degree C. at aldehyde resin to isocyanate polymer ratios of from about 1:1 up to about 2:1.

27. The method of claim 14, which includes the step of mixing together said aldehyde resin and said isocyanate polymer prior to spraying.

28. The method of claim 14, which includes the steps of combining in-line said aldehyde resin and said polymeric diiocyanate prior to spraying.

29. The method of claim 27, wherein said mixing step comprises in-line static mixing of said aldehyde resin and said isocyanate polymer.

30. A method for applying an adhesive system onto lignocellulosic particles for adhering together said lignocellulosic particles in the formation of lignocellulosic particulate composite structures, said method comprising forming an adhesive system consisting essentially of an aldehyde resin and a isocyanate polymer; and spraying said adhesive system onto said lignocellulosic particles, for adhering together said lignocellulosic particles in the formation of lignocellulosic particulate composite structure.

31. The method of claim 30, which further includes the step of adding a carbonate material to said adhesive system.

32. The method of claim 30, wherein said carbonate material comprises an organic carbonate material.

33. The method of claim 30, wherein said isocyanate polymer has an isocyanate group (—NCO) content of at least about 20%.

34. The method of claim 30, wherein said adhesive system has an average viscosity of not more than about 500 cps for up to about 2 hours from the substantial completion of the formation of said adhesive system.

35. The method of claim 30, wherein said adhesive system has an average viscosity of not more than about 500 cps for up to about 3 hours from the substantial completion of the formation of said adhesive system.

36. The method of claim 30, wherein said adhesive system has a pot life of at least about 2 hours from the formation of said system.

37. The method of claim 30, wherein said adhesive system comprises a sprayable emulsion.

38. The method of claim 30, wherein said adhesive system has an onset temperature which is lower than an onset temperature of either one of the aldehyde resin and the isocyanate polymer, individually.

39. The method of claim 30, wherein the cure speed of the aldehyde resin and the isocyanate polymer in said system are substantially the same.

40. The method of claim 30, wherein said adhesive system has a similar cure speed at aldehyde resin to isocyanate polymer ratios of from about 1:1 up to about 4:1.

41. The method of claim 30, wherein said adhesive system has a cure time which is faster than the cure time of either one of the aldehyde resin and the isocyanate polymer thereby increasing throughput and reducing downtime of the formation of the lignocellulosic particulate composite structure.

42. The method of claim 30, which includes the step of mixing together said aldehyde resin and said isocyanate polymer prior to spraying.

43. The method of claim 30, which includes the steps of combining in-line said aldehyde resin and said polymeric diiocyanate prior to spraying.

44. The method of claim 42, wherein said mixing step comprises in-line static mixing of said aldehyde resin and said isocyanate polymer.

* * * * *

UNITED STATES PATENT AND TRADEMARK OFFICE
CERTIFICATE OF CORRECTION

PATENT NO.   : 6,297,313 B1  
DATED        : October 2, 2001  
INVENTOR(S)  : Wu-Hsiung Ernest Hsu It is certified that error appears in the above-identified patent and that said Letters Patent is hereby corrected as shown below:

Column 1,  
Line 13, "lignocelluosic" should read -- lignocellulosic --.  
Line 28, "Kg/m3," should read -- kg/m$^3$), --.  
Line 52, "MID/urea-" should read -- MDI/urea --.

Column 2,  
Line 32, ""("US 433")" should read -- "("US '433") --.

Column 3,  
Line 48, "employed enhance" should read -- employed to enhance --.

Column 5,  
Line 51, "le;.5qThe" should read -- The --.

Column 8,  
Line 25, "viscosity's" should read -- viscosities --.  
Line 47, "principles the invention:" should read -- principles of the invention --.

Column 9,  
Line 27, " for applying" should read -- for spraying --.

Column 10,  
Line 9, "diiocyanate" should read -- isocyanate --.  
Line 62, "diiocyanate" should read -- isocyanate --.

Signed and Sealed this

Twenty-sixth Day of November, 2002

Attest:

JAMES E. ROGAN  
*Attesting Officer*  *Director of the United States Patent and Trademark Office*